United States Patent [19]

Sloan et al.

[11] Patent Number: 5,141,759
[45] Date of Patent: Aug. 25, 1992

[54] COATED POTATO PRODUCT

[75] Inventors: Jerry L. Sloan, Richland; Karen F. Middaugh, Kennewick; Gerald B. Jacobsen, Richland, all of Wash.

[73] Assignee: Lamb-Weston, Inc., Tri-Cities, Wash.

[21] Appl. No.: 770,596

[22] Filed: Oct. 3, 1991

Related U.S. Application Data

[62] Division of Ser. No. 658,554, Feb. 21, 1991, Pat. No. 5,059,435.

[51] Int. Cl.$^5$ ............................................. A23L 1/217
[52] U.S. Cl. ................................... 426/102; 426/637; A23L/1/217
[58] Field of Search ..................... 426/102, 302, 637

[56] References Cited

U.S. PATENT DOCUMENTS

| | | |
|---|---|---|
| 3,175,914 | 3/1965 | Vahlsing, Jr. . |
| 3,597,227 | 8/1971 | Murray et al. ............... 426/302 X |
| 3,650,776 | 3/1972 | Tschirgi ............................ 426/302 X |
| 3,751,268 | 8/1973 | Van Patten et al. ........... 426/441 X |
| 3,956,515 | 5/1976 | Moore et al. .................... 426/302 |
| 4,272,553 | 6/1981 | Bengtsson et al. ............. 426/241 |
| 4,317,842 | 3/1982 | El-Hag et al. .................. 426/302 |
| 4,487,786 | 12/1984 | Junge ............................. 426/302 |
| 4,542,030 | 9/1985 | Haury et al. ................... 426/262 |
| 4,761,294 | 8/1988 | Hamann et al. ............... 426/438 |
| 4,931,296 | 6/1990 | Shanbhag ........................ 426/243 |
| 4,970,084 | 11/1990 | Pirrotta et al. ................ 426/637 X |

FOREIGN PATENT DOCUMENTS

| | | |
|---|---|---|
| 356492 | 4/1980 | Austria . |
| 026565 | 8/1980 | European Pat. Off. . |
| 1454341 | 11/1965 | France . |
| 85/01188 | 3/1985 | PCT Int'l Appl. . |
| 88/06007 | 8/1988 | PCT Int'l Appl. . |

*Primary Examiner*—Arthur L. Corbin
*Attorney, Agent, or Firm*—Klarquist, Sparkman, Campbell, Leigh & Whinston

[57] ABSTRACT

A process for preparing frozen coated potato products is disclosed. Raw potatoes are washed, cut, blanched, and partially dehydrated. The cut potatoes are then coated with an aqueous starch slurry. The aqueous starch slurry is comprised of a combination of modified ungelatinized potato starch, modified ungelatinized corn starch, rice flour and other optional ingredients. The coated potato strips are parfried in oil, then frozen. The frozen strips are prepared for consumption by either finish frying in hot oil, or heating in an oven. The starch coating enhances the holding quality of the ready to consume product. It also improves the acceptability of the finished product by increasing the crispiness of the outer surface, and helping to maintain the tenderness of the interior of the cut potato.

3 Claims, No Drawings

COATED POTATO PRODUCT

RELATED APPLICATION DATA

This application is a division of copending application Ser. No. 07/658,554, filed Feb. 21, 1991, now U.S. Pat. No. 5,059,435.

BACKGROUND OF THE INVENTION

This invention relates to a process for preparing frozen coated potato products, and in particular, a method for preparing an aqueous starch enrobing slurry and for applying the slurry to the outer surface of potatoes to form a coating thereon prior to freezing.

Methods for preparing and applying coatings to the outer surfaces of frozen potato products are known in the art. For example, U.S. Pat. No. 3,597,227 to Murray et al. discloses a process in which raw potato strips are coated in a hot aqueous solution of modified amylose, with the coated strips containing from about 0.002 to 0.02 percent by weight of amylose. Prior to coating the potatoes, the amylose solution is heated until all the amylose has been gelatinized. This process is supposed to produce a finished product which has superior strength and rigidity, yet is not objectionably tough. The finished product also purportedly has a reduced oil content.

Similarly, U.S. Pat. No. 3,751,268 to Van Patten et al. discloses the coating of blanched potato pieces with 0.1 to 1.5 percent by weight of an ungelatinized unmodified high amylose starch having an amylose content of at least 50 percent. The coated potato strips are deep fat fried. Among other things, deep frying gelatinizes the starch in the coating. The finished product reportedly had less oil and improved texture.

Another approach is disclosed in U.S. Pat. No. 4,317,842 to El-Hag et al. In that patent, blanched potato strips are dipped in an aqueous ungelatinized starch slurry to coat the strips, which are next soaked in hot oil to gelatinize the starch in the coating. The strips are then parfried and frozen. The potato strips prepared according to this process are reheated for consumption by cooking in an oven, as opposed to deep fat frying.

U.S. Pat. No. 4,487,786 to Junge describes a method of preparing a starch enrobing slurry for coating the outer surface of a frozen food product, such as pizza, in which the frozen pizza product is dipped in an aqueous starch slurry, sprayed with a lipid solution, and thereafter refrozen. The product is prepared for consumption by deep fat frying.

There remains a need for an improved process for making frozen coated potato products, particularly one which improves the characteristics of the product as well.

Objects

A primary object of this invention is to provide a starch coating on frozen potato products which will enhance the commercial holding quality of the potato product after finish frying.

One important object of this invention is to provide an aqueous starch slurry which minimizes clumping of the potato strips as they are deep fried in hot oil.

Another important object is to provide a starch coating which improves the acceptability of the finished potato product.

Another important object of this invention is to provide a frozen potato product which can be prepared for consumption by heating in an oven, as well as deep fat frying. Potato strips prepared by oven heating are less oily than similar potato strips prepared by deep fat frying, yet they retain a crispy outer surface.

Still another important object of this invention is to provide such an aqueous starch slurry which provides a starch coating that remains intact for a substantial period of time after the frozen potato product begins to thaw and prior to its finish frying.

SUMMARY OF THE INVENTION

In accordance with the present invention, raw potatoes are washed, cut, blanched, and partially dehydrated in accordance with well-known procedures. Such procedures are exemplified in U.S. Pat. No. 3,397,993 to Strong. After partial dehydration, the potato strips are coated with an aqueous starch slurry that is applied by either dipping the potato strips in the slurry, or spraying the slurry onto the outer surfaces of the potato strips. After a short draining period to remove excess coating, the potato strips are parfried and frozen in accordance with known processes.

The aqueous starch enrobing slurry of the present invention is comprised of a combination of chemically modified ungelatinized potato starch, chemically modified ungelatinized cornstarch, rice flour and other optional ingredients. It functions as a film forming agent that becomes a crust-like enclosure for the potato product when it is parfried. The coating improves consumer acceptance of the product by increasing crispiness of the outer surface of the potato strip, helping to retain moisture in the finish fried product, and improving flavor. It also allows the frozen strip to be reconstituted by cooking in an oven, producing an acceptable product.

The amount of the starch coating applied to the potato strips is controlled primarily by the viscosity of the slurry. It has been found that optimal results are obtained when the potato strips pick up between 9 and 18 percent of their weight in starch slurry.

The aqueous starch coating described herein is advantageous in that potatoes prepared according to this process have, in addition to improved consumer acceptance, extended holding quality after finish frying or oven cooking. The additional holding quality is extremely important in the operation of fast food restaurants.

Additional objects and advantages of the present invention will be apparent from the following detailed description of the process for preparing the starch slurry and the frozen potato product coated therewith.

DETAILED DESCRIPTION

Raw potatoes, preferably of the Russet-Burbank variety, are washed and sorted to remove defective potatoes. The potatoes are next peeled; however, if a finished product with peel remaining intact is desired, this step may be omitted. The whole potatoes are then preheated for about 20 to 60 minutes within a temperature range 120° to 140° Fahrenheit, preferably for 60 minutes at 130° Fahrenheit. The potatoes are then cut into appropriately sized and shaped pieces, for example, 9/32 inch strips.

The potato strips are then blanched in order to inactivate enzymes and to leach free starch from the surface of the potato strip. Blanching may be accomplished through either hot water immersion or steam blanching.

If hot water immersion is used the strips are blanched for about five to seven minutes at a temperature of about 160° to 190° Fahrenheit, preferably for six minutes at 180° Fahrenheit. If steam blanching is used the potato strips are preferably blanched for about 1-3 minutes at about 210°-215° Fahrenheit. It will be appreciated that the immersion time for smaller strips is slightly shorter (for example, about 4 to 6 minutes for 7/32 inch strips). Conversely, the immersion time for larger strips is slightly longer at preferably a lower blanching temperature (for example, about 10 to 15 minutes at 160° to 170° Fahrenheit for steak house strips).

After blanching, the potato strips are optionally immersed in a brine solution containing such ingredients as sodium acid pyrophosphate, sodium chloride, and dextrose. The contents of the brine solution will depend on the characteristics desired in the end product.

After blanching, and after the immersion step if it is used, the potato strips are air dried in a conventional air dryer set to a temperature between 200° and 230° Fahrenheit, preferably at 210° Fahrenheit, in order to accomplish a moisture loss within the range of 10 to 20 percent, and preferably within the range of 17 to 18 percent.

The strips are then coated with an aqueous starch slurry made up of chemically modified ungelatinized potato starch, chemically modified ungelatinized cornstarch, rice flour, whey, and water. Other optional ingredients such as flavors or seasonings and the like may be added to the slurry. With regard to the potato starch fraction of the slurry, it has been determined that using potato starch as the major component of the starch system produces optimal results. Thus, the potato starch fraction of the starch slurry makes up between about 15 to 35 percent of the weight of the slurry on a wet basis, and preferably about 27 percent. Raw potato starch which has been modified through known chemical cross-linking processes produces an optimal coating slurry since it minimizes sticking or clumping of the strips during processing, and coats the potato strips evenly. A chemically modified potato starch produced by Penford Corporation, Richland, Wash., and sold under the designation K-1010 is an acceptable potato starch for use with this invention (however, the K-1010 starch used with this invention is purchased from Penford in a preferred non-pregelatinized form). The starch sold by Penford under the designation K-1100 is acceptable as a substitute for the non-pregelatinized K-1010 product.

The starch slurry also contains chemically modified ungelatinized cornstarch, and rice flour. A slurry containing between two and ten percent by weight of the modified cornstarch, and also between two and ten percent by weight of rice flour produces an optimal result. Flojel® 60, produced by National Starch and Chemical Corporation, Bridgewater, N.J., has been found to be a satisfactory cornstarch for use with this invention.

As noted, the slurry may also contain other ingredients, such as whey and flavoring or seasoning ingredients, depending on the end result desired. For example, whey can be added to the slurry within a range of about 0.2 to 2.0 percent by weight to produce a coating which is golden brown in color, due to browning during deep fat frying, yet adds no perceptible flavor. Similarly, various spices or other flavoring ingredients may be added to the slurry for flavoring as desired.

The combination of modified ungelatinized potato starch, modified ungelatinized corn starch, and rice flour is important. The potato starch in the slurry tends to blend with the potato starch which is naturally present on the potato strips, resulting in a coating having a bland flavor that is not perceptible to the consumer. Both the potato starch and the corn starch in the slurry contribute crispness to the coating, and because they are not gelatinized prior to the parfrying step they decrease clumping of the strips during processing. The rice flour has been found to provide a desireable tenderness in the finished product.

The viscosity of the starch slurry is also important because it controls the amount of the slurry which is retained on the potato strips. The viscosity is controlled primarily by the ratio of the combined weight of the mixture of dry ingredients to the amount of water present, and to a lesser degree by the temperature of the slurry. It is important to maintain the temperature of the slurry below the gelatinization temperature of the starches since it has been found that a slurry containing gelatinized starch is difficult to work with, and causes clumping of the strips during the frying steps. To prepare the starch slurry, the dry ingredients, including the potato starch, cornstarch, rice flour, whey, and other ingredients such as flavorings, are dry blended for approximately five minutes. The dry blended ingredients are then slowly added to the proper amount of water and dispersed by agitation. It has been found that a blend of one part dry ingredients to about 1.3-1.8 parts water produces a slurry within the acceptable viscosity range. The viscosity is adjusted according to size and shape of the potato being coated. The starch slurry is preferably maintained at a temperature below about 70° Fahrenheit while the slurry is mixed and during the coating process. Because the starches remain ungelatinized during the coating steps they contribute relatively little viscosity to the slurry. In addition, it is necessary to prevent the starches from settling out of the starch suspension. This may be accomplished by agitating the slurry or by constantly circulating it during processing.

The potato strips are coated with starch slurry between the range of 9 to 25 percent by weight, and preferably within the range of 12 to 15 percent. Thus, by utilizing a slurry prepared as discussed above, and coating the strips within the acceptable range, the potato strips, prior to parfrying, will contain between about 1 to 6 percent modified potato starch, and between about 0.1 to 2.0 percent modified corn starch and rice flour. It has been found that a slurry coating within this range produces optimal results yet minimizes clumping of potato strips during parfrying and finish frying or oven cooking.

After coating with starch slurry, the potato strips are drained to remove excess starch slurry. Adequate draining may be accomplished within a time range of 10 to 20 seconds, and of course will depend on the viscosity of the starch slurry. At any rate, the draining time should be such as to produce a potato strip with the optimal level of coating.

The potato strips are next parfried within a range of about 30-90 seconds at about 370° Fahrenheit. Parfrying gelatinizes the potato tissue, removes moisture from the inside of the potato, and importantly gelatinizes the starches in the coating. The gelatinization of the starch in the coating produces a crisp outer coating.

The parfried strips are then frozen, packaged, and stored at approximately 0° Fahrenheit until finish frying or oven cooking.

The frozen strips are prepared for consumption by either finish frying or oven cooking in a conventional oven or an impingement oven. After such preparation the coated strips have a crisp outer layer, a moist and tender interior, and increased holding quality when compared to non-coated strips.

EXAMPLE I

A starch slurry for coating the potato products was prepared in accordance with the proportion of ingredients listed in Table 1.

TABLE 1

| Ingredients | Weight Percentage |
|---|---|
| Water | 66.6% |
| Modified potato starch | 22.7% |
| Modified cornstarch | 5.0% |
| Rice flour | 5.0% |
| Whey | 0.7% |
| TOTAL: | 100.0% |

Russet-Burbank potatoes were peeled, then preheated for 20 minutes at 130° Fahrenheit. The potatoes were then cut into 9/32 inch strips and immersion blanched in steam for 90 seconds at 213°-215° Fahrenheit.

After blanching the potato strips were immersed for 30 seconds in an aqueous solution containing 2.5 percent by weight salt, 0.50 percent by weight sodium acid pyrophosphate. The solution was held at 150°-180° Fahrenheit. After removal from the solution the strips were drained and then dried in a conventional air dryer at 210° Fahrenheit, for a sufficient length of time to effectuate a 17 percent moisture loss.

The potato strips were then dipped in a starch slurry prepared according to Table 1. The slurry was held at a temperature of about 65° Fahrenheit. The potato strips were drained for 15 seconds to remove excess slurry, resulting in the potato strips containing a wet starch slurry coating of approximately 14 percent by weight. The strips were then parfried in canola or soybean oil for 40 seconds at 370° Fahrenheit. During the frying step the starches in the coating gelatinized, forming a thin, crust-like layer which adhered to the potato strips. The potato strips were then frozen at approximately −20° Fahrenheit.

The potato strips were prepared for consumption by finish frying in hot oil at 350° Fahrenheit for 2 minutes, 45 seconds. Upon removal from the finish fryer the potato strips were light, golden brown in color, with a crisp outer surface and a moist interior texture. Importantly, the starch coating was not visibly perceptible on the finished product.

During the initial frying step the potato strips did not clump together. Nor did the strips clump together after removal from the freezer and prior to finish frying, or during finish frying. The interior of the finished potato strips was more tender than a similar product produced according to the same process but omitting the batter coating. The exterior had a desirably crisp outer surface. Additionally, the finished fries had a longer holding quality after finish frying than uncoated fries.

A control sample of french fries was run for comparison purposes. The control sample was processed in an identical manner as that listed above with the lo exception of omitting the coating step. Analysis of the coated versus noncoated control samples is as follows:

TABLE A

| Sample | | % Solids | % Oils |
|---|---|---|---|
| Coated: | parfried | 37.22% | 6.72% |
|  | refried | 61.67% | 13.32% |
| Noncoated (control): | parfried | 36.62% | 6.35% |
|  | refried | 62.46% | 15.98% |

EXAMPLE II

A starch slurry for coating potato products was prepared in accordance with the proportion of ingredients listed in Table 2.

TABLE 2

| Ingredients | Weight Percentage |
|---|---|
| Water | 58.3% |
| Modified Potato Starch | 28.2% |
| Modified Cornstarch | 5.9% |
| Rice Flour | 5.9% |
| Whey | 1.7% |
|  | 100.0% |

Russet-Burbank potatoes were peeled, then preheated for 20 minutes at 130° Fahrenheit. The potatoes were then cut into 9/32 inch strips and immersion blanched in hot water for six minutes at 180° Fahrenheit.

After blanching the potato strips were immersed for 30 seconds in an aqueous solution containing 2.5 percent by weight salt, 0.75 percent by weight sodium acid pyrophosphate, and 0.3 percent by weight dextrose. The solution was held at 150°-180° Fahrenheit. After removal from the solution the strips were drained and then dried in a conventional air dryer at 210° Fahrenheit, for a sufficient length of time to effectuate a 17 percent moisture loss.

The potato strips were then dipped in a starch slurry prepared according to Table 2. The slurry was held at a temperature of about 70° Fahrenheit. The potato strips were drained for 15 seconds to remove excess slurry, resulting in the potato strips containing a wet starch slurry coating of approximately 14-15 percent by weight. The strips were then parfried in canola or soybean oil for 60 seconds at 370° Fahrenheit. During the frying step the starches in the coating gelatinized, forming a thin, crust-like layer which adhered to the potato strips. The potato strips were then frozen at approximately −20° Fahrenheit. The frozen samples were reconstituted by heating in a single layer in either a conventional oven, or a high velocity impingement oven.

The product resulting from heating in a conventional oven was generally uniformly light golden brown in color, with minimal browning on the tips of the potato strips. The product had crisp outer texture, moist tender interior texture, and was less oily than potato strips prepared according to the process detailed in Example I above. The product resulting from heating in a high velocity impingement oven was identical to that resulting from heating in a conventional oven.

EXAMPLE III

A starch slurry for coating the potato products was prepared in accordance with the proportion of ingredients listed in Table 3.

TABLE 3

| Ingredients | Weight Percentage |
|---|---|
| Water | 57.6% |
| Modified potato starch | 27.4% |
| Modified cornstarch | 5.8% |
| Rice flour | 5.8% |
| Whey | 0.7% |
| Salt | 0.7% |
| Seasonings and/or flavorings | 2.0% |
| TOTAL: | 100.0% |

The potatoes were processed in a manner identical to those in Example II above except they were parfried for 40 seconds instead of 60 seconds. The finished product was more tender, and had a crispier outer surface than a similar product produced according to the same process but omitting the batter coating. The finished fries had a longer holding quality after finish frying than uncoated fries, and the product retained a mild, savory flavor due to the seasoning ingredients and the salt in the coating.

EXAMPLE IV

A starch slurry for coating the potato products was prepared in accordance with the proportion of ingredients listed in Table 4.

TABLE 4

| Ingredients | Weight Percentage |
|---|---|
| Water | 72.2% |
| Modified potato starch | 16.4% |
| Modified cornstarch | 4.0% |
| Rice flour | 4.0% |
| Whey | 0.6% |
| Toasted potato flakes | 2.8% |
| TOTAL: | 100.0% |

The potatoes were processed in a manner identical to that listed in Example III, except the strips were dipped in the starch slurry prepared according to Table 4 for a time sufficient to provide a pickup of wet batter of about 19% by weight. The finished product exhibited similar desirable characteristics as listed in Example I, with two exceptions. The toasted potato flakes enhanced the potato flavor slightly. The holding quality after finish frying was slightly shorter than the prior examples due to the reduced modified potato starch percentage and increased water content from absorption by the potato flakes, but longer than uncoated fries.

EXAMPLE V

The starch slurry was prepared in accordance with the proportion of ingredients listed in Table 5.

TABLE 5

| Ingredients | Weight Percentage |
|---|---|
| Water | 60.0% |
| Modified potato starch | 15.6% |
| Modified cornstarch | 5.8% |
| Rice flour | 5.8% |
| Whey | 0.8% |
| Toasted potato granules | 12.0% |
| TOTAL: | 100.0% |

The processing parameters were identical to those listed in Example III, except the fries were coated with approximately 20% by weight of wet batter coating. The finished product retained the same desirable characteristics as the product from Example I, but had an improved potato flavor due to the toasted potato granules and a slightly shorter holding time after finish frying due to the reduced potato starch percentage.

EXAMPLE VI

The starch slurry was prepared in accordance with the proportion of ingredients listed in Table 6.

TABLE 6

| Ingredients | Weight Percentage |
|---|---|
| Water | 60.0% |
| Modified potato starch | 27.6% |
| Modified cornstarch | 5.8% |
| Rice flour | 5.8% |
| Whey | 0.8% |
| TOTAL: | 100.0% |

Potatoes were preheated for 20 minutes at 130° Fahrenheit, then cut on a modified Urschel CCL machine for making lattice or waffle style potato slices (see U.S. Pat. No. 4,523,503). The waffle slices were blanched in water for 6 minutes at 180° Fahrenheit, then dipped for 30 seconds in a brine solution containing 2.5% sodium chloride, 0.75% sodium acid pyrophosphate, and 0.25% dextrose. The brine solution was held at 150°–180° Fahrenheit. The waffle slices were then air dried at 210° Fahrenheit to a 16–18% weight loss. The potatoes were coated with a slurry prepared in accordance with that listed in Table 6 above, to yield a coated product having a 15% by weight batter pickup. The coated product was parfried for 40 seconds at 370° Fahrenheit, then frozen at −20° Fahrenheit.

The frozen product was reconstituted by finish frying for 2 minutes, 30 seconds at 350° Fahrenheit.

The finished product was golden in color with dark highlights, had a crisp outer surface and a tender interior. The outer surface was crispier than a similarly prepared product but in which the batter coating was omitted. Further, the finished fries had a longer holding quality after finish frying than uncoated fries.

EXAMPLE VII

Raw, peeled potatoes were cut into 5/16 inch by 3/8 inch strips, then steam blanched for 2 minutes at 215° Fahrenheit. The strips were then dipped for 30 seconds in a brine solution containing 3.5% sodium chloride, 0.75% sodium acid pyrophosphate, and about 0.2% dextrose. The brine solution was held at 150°–180° Fahrenheit. The strips were next air dried at 210° Fahrenheit to a 12–13% weight loss, and coated with a slurry prepared in accordance with that listed in Table 6 above. The product was coated with batter at a 11–12% pickup by weight. These strips were then parfried 50 seconds at 370° Fahrenheit and frozen at −20° Fahrenheit.

The frozen product was reconstituted by frying for 3 minutes, 30 seconds at 350° Fahrenheit. The finished product had a golden color with dark highlights on the edges, was crisp on the outside and tender on the inside, and demonstrated improved holding quality when compared to a noncoated product.

Having illustrated and described the principles of our invention with reference to several preferred embodiments, it should be apparent to those of ordinary skill in the art that the invention may be modified in arrangement and detail without departing from such principles. Accordingly, we claim as our invention all such modifications as come within the true spirit and scope of the following claims.

We claim:

1. A potato product comprising cut potatoes having a coating, the coating comprising, by weight of the potatoes, about 1-6 percent chemically modified ungelatinized potato starch, about 0.2-2.0 percent chemically modified ungelatinized corn starch, and about 0.2-2.0 percent rice flour.

2. The potato product of claim 1 wherein the coating further includes whey.

3. The potato product of claim 1 wherein the coating further includes seasoning or flavoring ingredients.

* * * * *